United States Patent
Singhal et al.

(10) Patent No.: US 8,543,940 B2
(45) Date of Patent: Sep. 24, 2013

(54) METHOD AND APPARATUS FOR BROWSING MEDIA CONTENT AND EXECUTING FUNCTIONS RELATED TO MEDIA CONTENT

(75) Inventors: Nitin Singhal, Gyeonggi-do (KR);
Sung-Dae Cho, Yongin-si (KR);
Chung-Hoon Kim, Seongnam-si (KR);
Yoon-Choon Hwang, Incheon (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 12/911,295

(22) Filed: Oct. 25, 2010

(65) Prior Publication Data

US 2011/0099514 A1    Apr. 28, 2011

(30) Foreign Application Priority Data

Oct. 23, 2009 (KR) .................. 10-2009-0101248

(51) Int. Cl.
*G06F 3/048* (2006.01)
*G06F 3/00* (2006.01)

(52) U.S. Cl.
USPC ........... 715/809; 715/835; 715/838; 715/840; 382/284

(58) Field of Classification Search
USPC .............. 715/835, 838, 840, 760; 382/284
See application file for complete search history.

(56) References Cited

U.S. PATENT DOCUMENTS

| | | | |
|---|---|---|---|
| 6,263,507 B1 | 7/2001 | Ahmad et al. | |
| 6,273,979 B1 * | 8/2001 | Lastoria | 156/63 |
| 6,437,797 B1 * | 8/2002 | Ota | 345/638 |
| 6,628,283 B1 * | 9/2003 | Gardner | 345/427 |
| 6,687,419 B1 * | 2/2004 | Atkin | 382/284 |
| 7,058,944 B1 * | 6/2006 | Sponheim et al. | 718/100 |
| 7,353,246 B1 * | 4/2008 | Rosen et al. | 709/202 |
| 7,386,806 B2 * | 6/2008 | Wroblewski | 715/788 |
| 7,403,211 B2 * | 7/2008 | Sheasby et al. | 345/661 |
| 7,454,711 B2 * | 11/2008 | Angiulo et al. | 715/760 |
| 7,529,429 B2 * | 5/2009 | Rother et al. | 382/284 |
| 7,532,771 B2 | 5/2009 | Taylor et al. | |
| 7,564,994 B1 * | 7/2009 | Steinberg et al. | 382/118 |
| 7,576,755 B2 * | 8/2009 | Sun et al. | 345/629 |
| 7,587,276 B2 * | 9/2009 | Gold et al. | 701/426 |
| 7,596,755 B2 * | 9/2009 | Graham | 715/723 |
| 7,634,138 B2 * | 12/2009 | White et al. | 382/209 |
| 7,689,064 B2 * | 3/2010 | Miksovsky et al. | 382/294 |

(Continued)

FOREIGN PATENT DOCUMENTS

| | | |
|---|---|---|
| KR | 1020040011336 | 2/2004 |
| KR | 100851406 | 8/2008 |
| KR | 1020080096048 | 10/2008 |
| KR | 1020090000577 | 1/2009 |

*Primary Examiner* — Steven B Theriault
(74) *Attorney, Agent, or Firm* — The Farrell Law Firm, P.C.

(57) ABSTRACT

A method and apparatus for browsing media content and executing functions related to the media content are provided. Under the state that a collage image generated by combining a plurality of image elements corresponding respectively to a plurality of media contents is displayed, if a selection input is generated on the collage image, a preview window for a media content corresponding to a location of a point where the selection input is generated is configured to overlay the preview window on the collage image. If a function execution input is generated on the collage image, a representative function is performed using a media content corresponding to a location of a point where the function execution input is generated.

18 Claims, 9 Drawing Sheets
(5 of 9 Drawing Sheet(s) Filed in Color)

(56) References Cited

U.S. PATENT DOCUMENTS

| | | | |
|---|---|---|---|
| 7,697,785 B2* | 4/2010 | Chiu et al. | 382/284 |
| 7,739,306 B2* | 6/2010 | Manousos et al. | 707/796 |
| 7,756,332 B2* | 7/2010 | Jager | 382/173 |
| 7,904,455 B2* | 3/2011 | Chiu et al. | 707/737 |
| 7,948,504 B2* | 5/2011 | Sheasby et al. | 345/661 |
| 8,078,969 B2* | 12/2011 | Harrison | 715/732 |
| 8,126,192 B2 | 2/2012 | Sagoo et al. | |
| 8,254,684 B2* | 8/2012 | Raju | 382/181 |
| 8,280,164 B2* | 10/2012 | Luo et al. | 382/173 |
| 2002/0033848 A1* | 3/2002 | Sciammarella et al. | 345/838 |
| 2003/0095720 A1* | 5/2003 | Chiu et al. | 382/284 |
| 2003/0202110 A1* | 10/2003 | Owens et al. | 348/222.1 |
| 2004/0064836 A1* | 4/2004 | Ludvig et al. | 725/95 |
| 2004/0073941 A1* | 4/2004 | Ludvig et al. | 725/113 |
| 2004/0090462 A1* | 5/2004 | Graham | 345/767 |
| 2004/0120009 A1* | 6/2004 | White et al. | 358/1.18 |
| 2004/0123131 A1* | 6/2004 | Zacks et al. | 713/200 |
| 2004/0160462 A1* | 8/2004 | Sheasby et al. | 345/788 |
| 2004/0160624 A1 | 8/2004 | Elgar et al. | |
| 2004/0205091 A1* | 10/2004 | Mulcahy et al. | 707/204 |
| 2005/0044485 A1* | 2/2005 | Mondry et al. | 715/502 |
| 2005/0160377 A1* | 7/2005 | Sciammarella et al. | 715/838 |
| 2005/0188057 A1 | 8/2005 | Joo | |
| 2005/0210414 A1* | 9/2005 | Angiulo et al. | 715/838 |
| 2006/0062455 A1* | 3/2006 | Chiu et al. | 382/173 |
| 2006/0106764 A1 | 5/2006 | Girgensohn et al. | |
| 2006/0173990 A1 | 8/2006 | Kitada et al. | |
| 2006/0181736 A1* | 8/2006 | Quek et al. | 358/1.18 |
| 2006/0224993 A1 | 10/2006 | Wong et al. | |
| 2006/0271287 A1* | 11/2006 | Gold et al. | 701/211 |
| 2007/0014542 A1* | 1/2007 | Poulsen | 386/107 |
| 2007/0058884 A1* | 3/2007 | Rother et al. | 382/284 |
| 2007/0074110 A1 | 3/2007 | Miksovsky et al. | |
| 2007/0098266 A1* | 5/2007 | Chiu et al. | 382/224 |
| 2007/0157084 A1* | 7/2007 | Yano et al. | 715/527 |
| 2007/0237421 A1* | 10/2007 | Luo et al. | 382/284 |
| 2008/0045138 A1* | 2/2008 | Milic-Frayling et al. | 455/3.04 |
| 2008/0120661 A1* | 5/2008 | Ludvig et al. | 725/105 |
| 2008/0144107 A1* | 6/2008 | Lieb | 358/1.18 |
| 2008/0155422 A1* | 6/2008 | Manico et al. | 715/731 |
| 2008/0189591 A1* | 8/2008 | Lection | 715/202 |
| 2008/0193048 A1* | 8/2008 | Sun et al. | 382/284 |
| 2008/0205789 A1* | 8/2008 | Ten Kate et al. | 382/284 |
| 2008/0215984 A1* | 9/2008 | Manico et al. | 715/730 |
| 2008/0222560 A1 | 9/2008 | Harrison | |
| 2008/0285892 A1 | 11/2008 | Sposato et al. | |
| 2008/0292162 A1 | 11/2008 | Gering et al. | |
| 2009/0003712 A1* | 1/2009 | Mei et al. | 382/225 |
| 2009/0015869 A1* | 1/2009 | Quek et al. | 358/1.18 |
| 2009/0021576 A1* | 1/2009 | Linder et al. | 348/36 |
| 2009/0046033 A1 | 2/2009 | Siegel | |
| 2009/0077459 A1* | 3/2009 | Morris et al. | 715/201 |
| 2009/0089448 A1 | 4/2009 | Sze et al. | |
| 2009/0132943 A1* | 5/2009 | Minsky et al. | 715/767 |
| 2009/0148064 A1* | 6/2009 | Schulz | 382/284 |
| 2009/0150947 A1* | 6/2009 | Soderstrom | 725/93 |
| 2009/0153648 A1 | 6/2009 | Quennesson | |
| 2009/0180162 A1* | 7/2009 | Cornell | 358/488 |
| 2009/0180692 A1* | 7/2009 | Sheasby et al. | 382/173 |
| 2009/0199090 A1* | 8/2009 | Poston et al. | 715/255 |
| 2009/0313558 A1* | 12/2009 | Yariv et al. | 715/760 |
| 2010/0002941 A1* | 1/2010 | Fonseca et al. | 382/209 |
| 2010/0005379 A1* | 1/2010 | Lanahan et al. | 715/202 |
| 2010/0005380 A1* | 1/2010 | Lanahan et al. | 715/204 |
| 2010/0005408 A1* | 1/2010 | Lanahan et al. | 715/764 |
| 2010/0005417 A1* | 1/2010 | Lanahan et al. | 715/815 |
| 2010/0030578 A1* | 2/2010 | Siddique et al. | 705/3 |
| 2010/0094849 A1* | 4/2010 | Rose et al. | 707/705 |
| 2010/0164986 A1* | 7/2010 | Wei et al. | 345/619 |
| 2010/0172586 A1* | 7/2010 | Sorek et al. | 382/181 |
| 2010/0199227 A1* | 8/2010 | Xiao et al. | 715/863 |
| 2010/0226566 A1* | 9/2010 | Luo et al. | 382/164 |
| 2010/0306696 A1* | 12/2010 | Groth et al. | 715/800 |
| 2010/0331041 A1* | 12/2010 | Liao et al. | 455/556.1 |
| 2011/0026835 A1* | 2/2011 | Ptucha et al. | 382/209 |
| 2011/0029860 A1* | 2/2011 | Ptucha et al. | 715/246 |
| 2011/0029884 A1* | 2/2011 | Grosz et al. | 715/739 |
| 2011/0099471 A1* | 4/2011 | Manijak et al. | 715/274 |
| 2012/0051668 A1* | 3/2012 | Martin et al. | 382/305 |
| 2012/0151408 A1* | 6/2012 | Groth et al. | 715/799 |
| 2012/0269394 A1* | 10/2012 | Kern et al. | 382/103 |

* cited by examiner

METHOD AND APPARATUS FOR BROWSING MEDIA CONTENT AND EXECUTING FUNCTIONS RELATED TO MEDIA CONTENT

PRIORITY

This application claims priority under 35 U.S.C. §119(a) to a Korean Patent Application filed in the Korean Intellectual Property Office on Oct. 23, 2009 and assigned Serial No. 10-2009-0101248, the entire disclosure of which is incorporated herein by reference.

BACKGROUND OF THE INVENTION

1. Field of the Invention

The present invention relates generally to media content, and more particularly, to a method and apparatus for browsing (or viewing) media content and executing functions related to the media content.

2. Description of the Related Art

With the development of a ubiquitous environment, a user's demand for a media content comprised of digital data has increased. The media content may include audio data, image data, moving picture data, text data, 3-Dimensional (3D) data, and the like.

As devices which can store and reproduce media content, for example, an MPEG Layer 3 (MP3) player, a Personal Media Player (PMP), a mobile communication terminal, a personal computer, a notebook computer, and a digital television have increased the capacity of data which they can store, the amount of storable media contents has also been increased and, thus, it has become difficult to manage such media content. Furthermore, such devices reproduce many types of media content rather than one type of a media content, the types and capacity of media content stored on the devices have increased.

Generally, a browser for browsing and searching media content uses a scheme for providing lists of names of media content and brief information about the media content or a scheme for listing thumbnail images related to the media contents.

However, schemes for simply providing only the name lists or listing the related thumbnail images may not interest users and, in any case, cannot accurately transmit information about the media content.

In the case of a browser, used to provide name lists, users may not know the details of the media content by seeing only the names of the media content. For example, if media contents are image files or audio files, it is not easy to accurately distinguish the image files or the audio files by only the file names where there are many other such files stored on a device.

As another example, in the case of a browser listing thumbnail images of image files, files may be distinguished by the thumbnail images but detailed information related to a specific file may not be available as only the thumbnail is shown. Namely, user manipulation should be needed to confirm information about a specific file. Moreover, spaces between the thumbnail images generated when listing the thumbnail images waste space on a display area.

SUMMARY OF THE INVENTION

An aspect of the present invention is to address at least the above-mentioned problems and/or disadvantages and to provide at least the advantages described below. Accordingly, an aspect of the present invention provides a method and apparatus for browsing a plurality of media content, wherein user manipulation is easy.

Another aspect of the present invention provides a method and apparatus which can easily distinguish between a plurality of media content and can efficiently transmit information related to the media content.

Another aspect of the present invention provides a method and apparatus, which can easily and quickly select a desired media content from among a plurality of media contents.

Another aspect of the present invention provides a method and apparatus which can quickly execute functions related to a media content selected by a user.

In accordance with an aspect of embodiments of the present invention, a method for browsing a media content and executing functions related to the media content by a browser device includes displaying a collage image generated by combining a plurality of image elements corresponding, respectively, to a plurality of media contents, if a selection input is generated on the collage image; obtaining one or more elements of an image element and a text element corresponding to a location of a point where the selection input is generated; and configuring a preview window for a specific media content using the one or more elements to overlay the preview window on the collage image, wherein the text element corresponds to the specific media content and includes information about the specific media content.

The method further includes, if a function execution input is generated on the collage image, obtaining a text element corresponding to a location of a point where the function execution input is generated, and performing a representative function using a media content related to the obtained text element according to information about the representative function included in the obtained text element.

The method further includes, if a function icon included in the preview window is selected, performing a function corresponding to the function icon using the specific media content corresponding to the obtained one or more elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

The present invention provides a media content browsing and executing method and apparatus to improve functions for browsing, searching, or executing various types of media contents and provides a browser User Interface (UI) which can quickly and effectively browse, search, and select a media content and can easily execute the selected media content.

Media content is comprised of audio data, image data, moving picture data, text data, 3D data, etc according to its type. Therefore, in the present invention, media content may be one of an audio file, an image file, a moving picture file, a text file, and a 3D image file. A plurality of media contents may be a plurality of files, each file representing media content.

A media content device for reproducing the media content and providing the media content in a form which can be recognized by users may be an MP3 player, a PMP, a mobile communication terminal, a personal computer, a notebook computer, a digital television, an electronic dictionary, a Personal Digital Assistant (PDA), etc. Accordingly, the present invention may be applied to various types of media content devices including not only the above-described devices and but also devices which are not mentioned above.

A media content browser UI, according to the present invention, uses a collage image. The collage image is one image generated by combining a plurality of images. According to an embodiment of the present invention, images corresponding to a plurality of media contents to be browsed are used to generate one collage image, and these images are referred to as image elements.

Moreover, a text file is generated which corresponds to each of a plurality of media contents to be browsed and includes information about a media content, and such a text file is referred to as a text element.

In the present invention, a metadata file is generated including link information between an image element, constituting a collage image, and a text element related to the image element. The collage image and the metadata file constitute a browser UI for searching a plurality of media contents corresponding to the collage image.

If the browser UI, according to the present invention, is activated, a collage image is displayed on a screen of a multimedia content device. The collage image maintains the uniqueness of each of the image elements and simultaneously provides a plurality of image elements to a user. The collage image can be generated using an entire display area of the device and thus a screen resolution of the device can be effectively used. The collage image is particularly effective when it is used in a portable device.

In the present invention, an image element and a text element, corresponding to a location of a pointer on a collage image, are confirmed using a metadata file, and using the confirmed image element and text element, text identification information about a specific media content is provided or preview information including brief information about a specific media content is provided. Accordingly, it is possible to simultaneously compare a plurality of media contents. Namely, a plurality of media contents can be browsed through a collage image and simultaneously a large amount of media contents can be reviewed.

Moreover, functions related to a specific media content can be executed at the request of users. Therefore, media content functions can be quickly executed.

Figure 1:
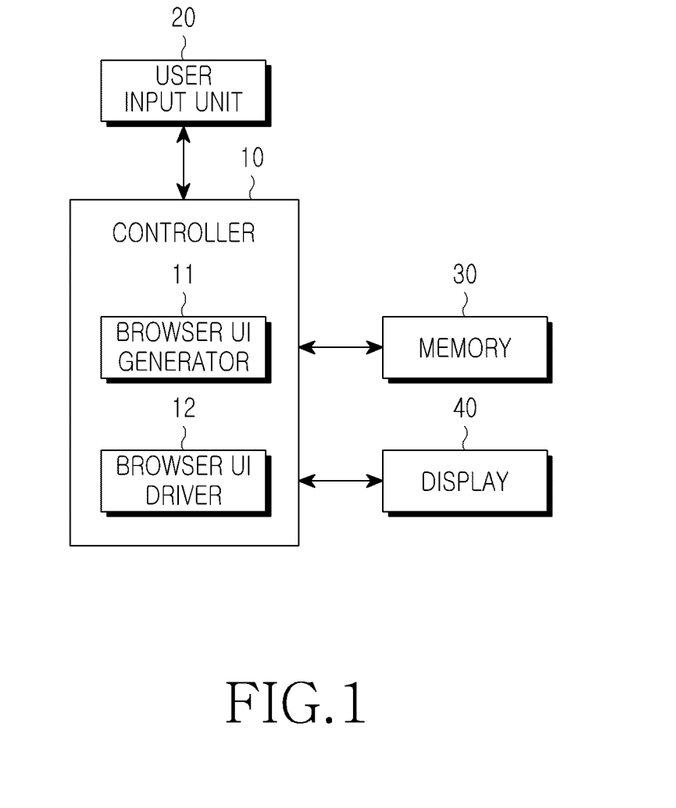
FIG. 1 is a block diagram illustrating a configuration of a browser device according to an embodiment of the present invention.

An example of a browser device for browsing and executing a media content to which the present invention is applied is illustrated in FIG. 1. The browser device, according to the present invention, may be included in the above-described devices.

Referring to FIG. 1, the browser device includes a controller 10, a user input unit 20, a memory 30, and a display 40.

The user input unit 20 provides input data generated according to user manipulation to the controller 10 and may be a keypad or a mouse, including function keys, numeral keys, and arrow keys.

The display 40 displays various media contents.

The memory 30 stores programs, storage data, which can be updated, and reference data, to process and control the controller 10, and is provided as a working memory of the controller 10.

The memory 30 stores various media contents. For example, the memory 30 may store a plurality of audio files, a plurality of image files, a plurality of moving picture files, a plurality of text files, and a plurality of 3D image files. The audio files may be music files or recorded files. The image files may be images generated through a camera or externally downloaded images. The moving picture files may be music moving picture files or film files. The text files may be document files, or phonebook data in which telephone numbers are registered. In the case of a phonebook, one text file may be present, corresponding to a registered name entry or a phone number. For example, one or more access numbers, address, note, anniversary date, etc., which are stored in the phonebook relating to one name entry, are included in one text file. Therefore, the phonebook includes one or more text files.

The memory 30 stores image elements, text elements, collage images, and metadata files generated according to an embodiment of the present invention.

An image element is used to generate a collage image and is generated to correspond to each of a plurality of media contents to be browsed. An example of the image element which may be generated according to a type of a media content is as follows. If the media content is an image file, then the image element may be a thumbnail, and if the media content is a moving picture file, then the image element may be an album art image, a film poster, a screen shot, or an arbitrary frame image. If the media content is an audio file, then the image element may be a cover image of a music album or a picture of a singer. If the media content is a phonebook, then the image element may be a face picture of a person corresponding to a name entry registered the phonebook. If the media content is a 3D file, then the image element may be a 2D projection of the 3D file.

A text element refers to an information file of each of a plurality of media contents to be browsed and is generated to correspond to each of a plurality of media contents. An example of the text element, which may be generated according to a type of media content is as follows. If the media file is an image file, then the text element may be a date or time when the image file is generated or stored, or a location, file name or resolution of the image file. In the case of the media content of a moving picture file, the text element may be a file name, title, director name, running time, resolution, or casting. In the case of the media content of an audio file, the text element may be a file name, album name, musician, writer, or singer. In the case of the media content of a text file, the text element may be a file name or saving time of the text file. In the case of the media content of a phonebook, the text element may be a name, address, access number, email address, home address, birthday, anniversary date, or note. In the case of the media content of a 3D file, the text elements may be information about a title, the number of frames, or geometry.

A collage image is an image generated by combining of a plurality of image elements. The capacity of the collage image is determined according to the number of image elements included in a single collage image. A display of a device is almost a rectangular shape and thus a rectangular collage image may be generated. To effectively browse and emphasize image elements included in a collage image, it is desirable that the resolution of an image element is above a reference value. In the present invention, the reference value is expressed as W×H (where W denotes the width of an image element and H denotes the height of an image element).

Therefore, the size of an image element obtained from an arbitrary media content is adjusted to be suitable for the reference value. It is desirable that a collage image be generated to cover a maximum display area. Thus, if the resolution of a screen is A×B, a capacity N of a collage image may be determined by the following Equation (1).

$$N = \left\lfloor \frac{A}{W} \right\rfloor \times \left\lfloor \frac{B}{W} \right\rfloor \quad (1)$$

In Equation (1), |X| denotes a maximum integer less than or equal to X (i.e. the floor). Accordingly, if the total amount of image elements corresponding to a target media content is greater than N, a plurality of collage images will be generated. Although the maximum number of image elements which can be included in one collage image may be restricted, a collage image can be generated by a plurality of image elements having the maximum number or less. One or more collage images may be present.

The controller 10 controls the overall operation of the browser device and includes a browser UI generator 11 and a browser UI driver 12 according to an embodiment of the present invention. The browser UI generator 11 can browse, search, and select a media content and controls the generation of a browser UI which can input execution commands for functions related to the selected media content. The browser UI driver 12 drives the browser UI and controls the operation of the browser device according to the driving of the browser UI.

Although an embodiment of the present invention has described the browser UI generator 11 and the browser UI driver 12, which are included in the controller 10, in other embodiments of the present invention, the browser UI generator 11 and the browser UI driver 12 may be configured such that they are separated from the controller 10 and are linked with the controller 10 in operation.

Figure 2:
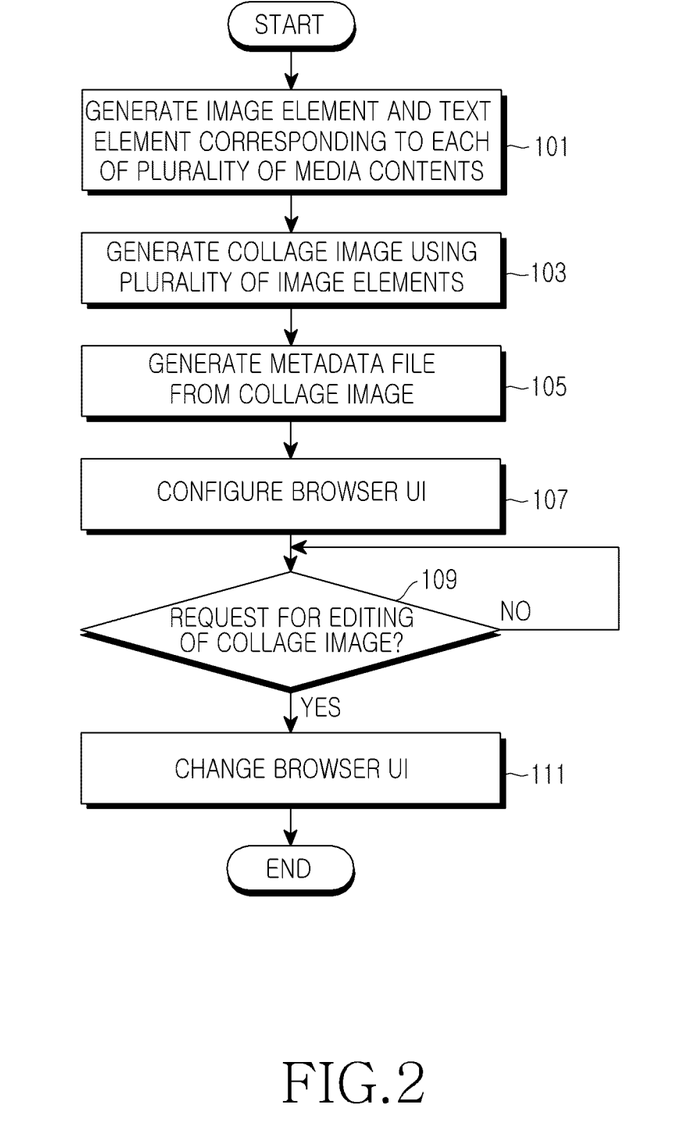
FIG. 2 is a flow chart illustrating an operating process of a browser UI generator according to an embodiment of the present invention.

A browser UI generating process by the browser device configured as described above will now be described with reference to FIG. 2. FIG. 2 illustrates a browser UI generating process by the browser UI generator 11, according to an embodiment of the present invention.

According to the present invention, a user may author a browser UI of a media content to be searched. Therefore, the browser UI generator 11 of the browser device may provide an authoring tool related to the generation of the browser UI through the display 40 to a user. Then the user may designate, through the authoring tool, a plurality of media contents to be browsed.

Then the browser UI generator 11 generates an image element and a text element corresponding to each of the designated plurality of media contents in step 101. The image element and text element may be automatically generated or may be configured by a user.

In other words, a user may also designate a type of information to be included in the image element and text element corresponding to each media content. For example, if the media content is an image file, an image element of a thumbnail may be automatically generated. However, if a user designates a specific part of each image file as an interested part, an image element of the interested part may be generated. If the media content is a moving picture file regarding a movie, an image of a poster of the movie may be automatically generated but an image corresponding to an arbitrary frame of the moving picture file may be designated as an image element by a user.

Any one piece of information included in the text element may be determined as representative information. The representative information indicates information displayed in correspondence to an image element at which a point is located when the pointer is located on a collage image under the state that the collage image is displayed by the driving of the browser UI. It is desirable to set minimum identification information of a media content, like a file name corresponding to the media content. The contents of information designated as the representative information may be directly selected by a user or a user may not set the representative information. The representative information is included in text element.

The text element includes one or more pieces of function information, which can be executed using media content. For example, the text element for an audio file may include audio play function information, the text element for a moving picture file may include moving picture play function information, the text element for an image file may include image editing function information, and the text element for a phonebook may include sending function information. A representative function may be automatically set or may be designated according to a user's selection.

Figure 4:
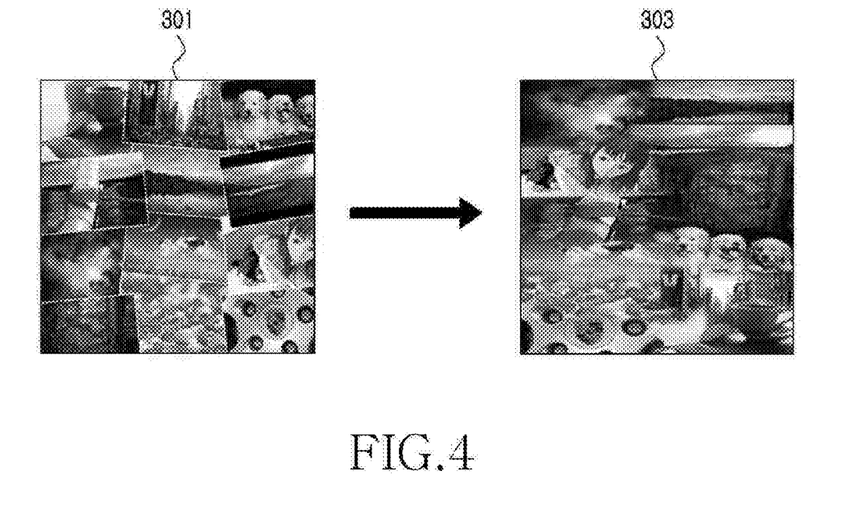
FIG. 4 is a diagram illustrating a collage image generating process according to an embodiment of the present invention.

If the image element and text element have been generated, the browser UI generator 11 generates a collage image using a plurality of image elements in step 103. When the collage image is generated, locations of the image elements may be randomly determined or a user may designate the locations of the image elements on the collage image. For example, the browser UI generator 11 may display a collage image arrangement pattern 301 as shown in FIG. 4. A user may move the locations of image elements on the arrangement pattern 301 of the collage image. According to a request to generate a collage image, a first collage image 303 may be generated. The collage image is generated by overlapping a partial region of a plurality of image elements and it is desirable that a boundary between the image elements be processed by blending processing. However, the present invention may use various collage image generating algorithms.

Referring back to FIG. 2, if the collage image has been generated, the browser UI generator 11 generates a metadata file from the collage image in step 105. In other words, if each image element region of the collage image arrangement pattern is filled with an image element, a pixel of the image element region corresponds to one image element. Accordingly, a pixel in a final collage image may have one label corresponding thereto.

Figure 5:
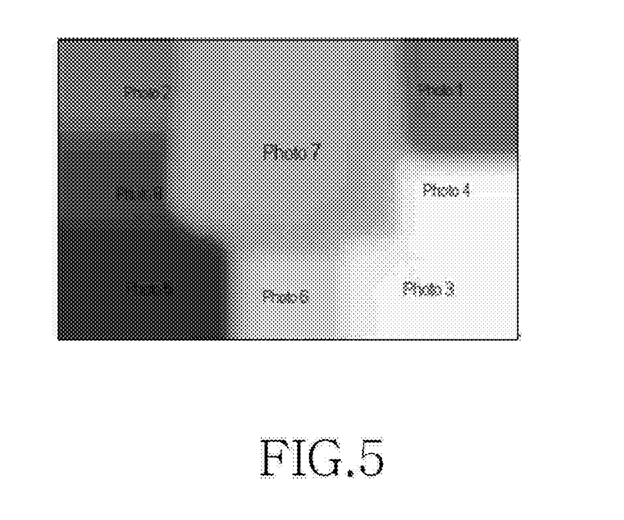
FIG. 5 is a diagram illustrating a gray level map according to an embodiment of the present invention.

The metadata file includes a label map for each pixel belonging to the collage image. The metadata file may link each pixel of the collage image and an image element corresponding to each pixel. A gray level of an image element may be used as a label of each pixel. An example of a label map using a gray level is shown in FIG. 5. FIG. 5 illustrates gray levels of a collage image comprised of 7 image elements.

For example, assuming there are a plurality of image elements is I={I1, I2, I3 ... I7}, a metadata file is M1, a location of a pixel using 2D coordinates is (x,y), and different gray levels within metadata are g={g1, g2, g3 ... g7}. In this case, each gray level corresponds to one image element. For instance, a gray level g1 corresponds to an image element I1 and a gray level g2 corresponds to an image element I2. In the pixel location (x,y), a gray level is obtained from metadata and an image element related to the gray level can be identified.

In this way, the metadata file adds a gray level to location coordinates of each pixel of a collage image as a label and includes information about an image element corresponding to a gray level. The metadata file may include identification information about a text element related to each image element.

If the metadata file has been generated, the browser UI generator 11 configures a browser UI by grouping the collage image, the metadata file, the image element, and the text element in step 107.

After the browser UI is generated, a user may edit the collage image. If the collage image is edited after the browser UI is generated, a metadata file related to the edited collage image is updated. An image element may be newly added to or may be deleted from the browser UI. Moreover, the location of the image element may be moved. The addition of the image element means that a content media to be searched is added and the deletion of the image element means that a content media is excluded from a management target of the browser UI.

If there is a request of a user for the editing of the collage image in step 109, the browser UI generator 11 changes the browser UI according to the editing in step 111.

Figure 6:
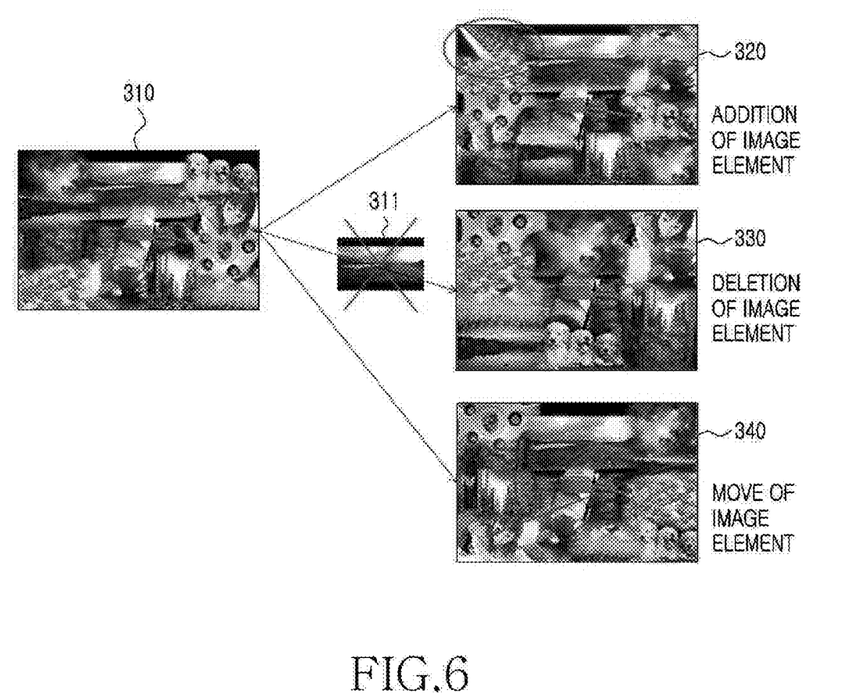
FIG. 6 is diagram illustrating a collage image editing process according to an embodiment of the present invention.

FIG. 6 illustrates an example of a collage image editing process after the browser UI is generated. A reference numeral 320 denotes the case where a new image element is added to the left upper side of a second collage image 310. A reference numeral 330 denotes the case where a landscape image element 311 is deleted from the second collage image 310, and a reference numeral 340 denotes the case where the location of a girl image element is moved from the right middle part of the second collage image 310 to the left lower part thereof.

Figure 3:
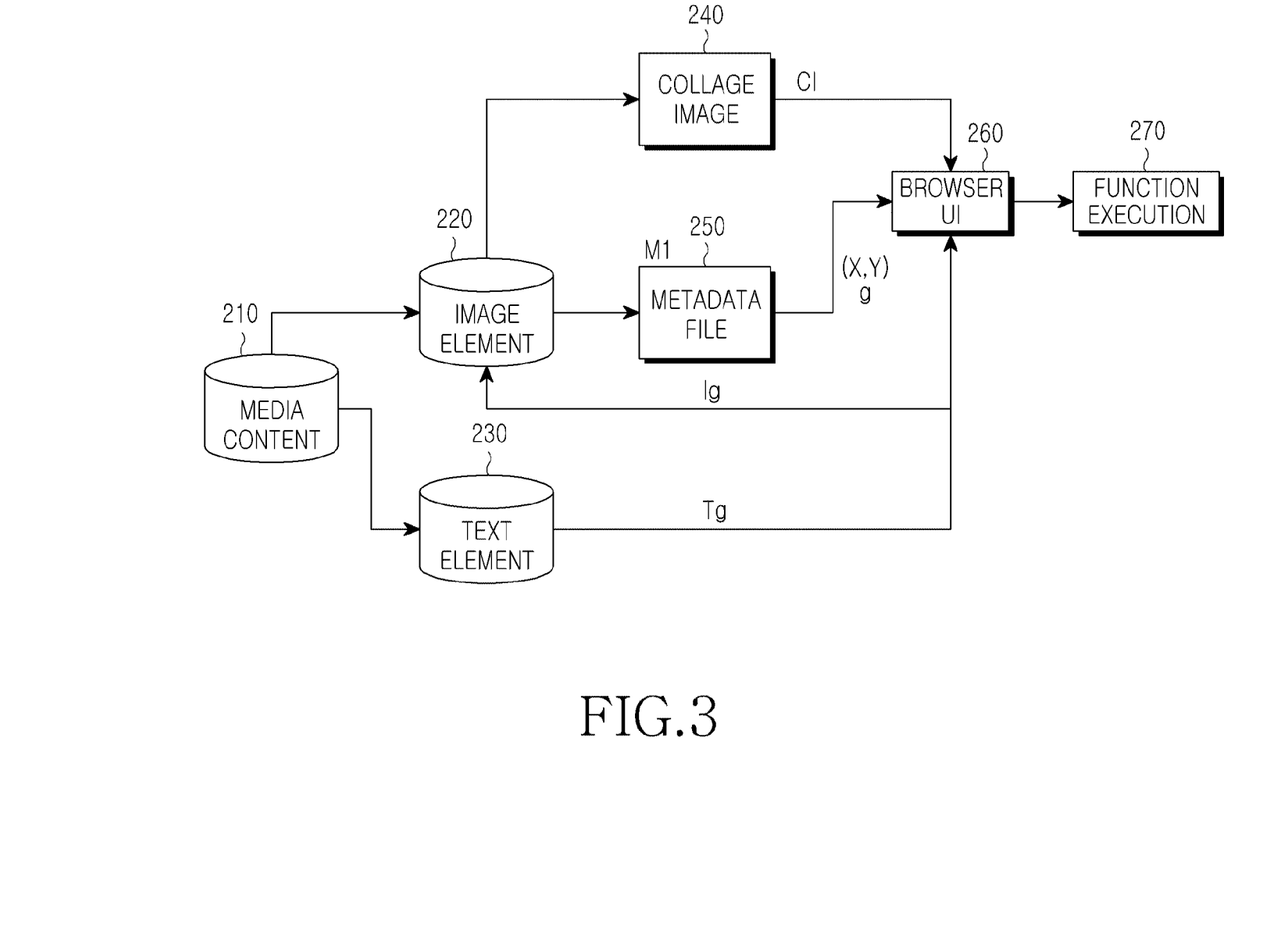
FIG. 3 is a block diagram illustrating a browser UI generating process according to an embodiment of the present invention.

The browser UI generating process described above is illustrated in FIG. 3 as a framework block. Referring to FIG. 3, an image element 220 and a text element 230 are generated from a media content 210. A collage image 240 and a metadata file 250 are generated from the image element 220. The image element 220, the text element 230, the collage image 240, and the metadata file 250 are grouped to configure a browser UI 260. A specific function 270 is executed through the browser UI 260.

Figure 7:
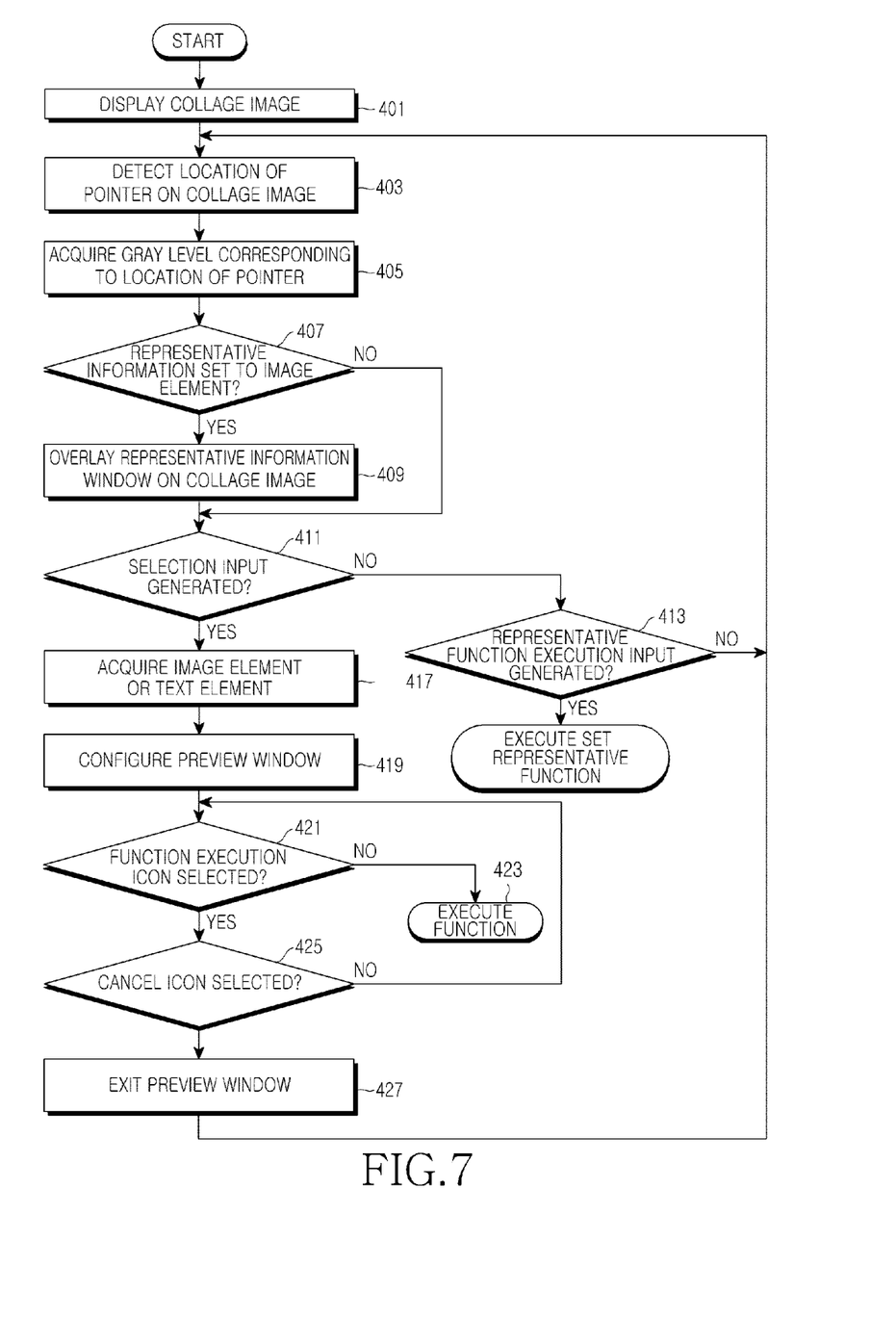
FIG. 7 is a flow chart illustrating a browser UI driving process according to an embodiment of the present invention.

A browser UI driving process by the browser UI driver 12 according to an embodiment of the present invention is illustrated in FIG. 7.

Referring to FIG. 7, the browser UI driver 12 displays a collage image in order to provide a browser UI in step 401. A user may change the location of a pointer on the collage image while browsing the displayed collage image. The pointer may be expressed by an indicator of an arrow shape or a cursor. The pointer may be moved through the manipulation of an arrow key or a mouse.

The browser UI driver 12 detects the location of the pointer on the collage image in step 403. The location of the pointer may be detected as a coordinates (x,y). The browser UI driver 12 acquires a gray level corresponding to the detected location of the pointer by using a metadata file in step 405. The UI driver 12 can identify an image element by acquiring the gray level.

The browser UI driver 12 confirms whether representative information is set to the image element corresponding to the gray level in step 407. If the representative information is set, the browser UI driver 12 overlays a representative information window on the collage image in step 409. For example, if a media content related to a currently driven browser UI is an image file, the file name of the image file may be set as the representative information. In this case, the file name of the image file corresponding to the image element at which the pointer is located is included in the representative information window and is displayed on the location of the pointer. If no representative information is set in step 407, the browser UI driver 12 proceeds to step 411.

The browser UI driver 12 confirms whether a selection input occurs in step 411. The selection input may be, for example, a user input such as a single click of a mouse. If the selection input is generated, the browser UI driver 12 acquires, in step 407, an image element or a text element corresponding to the gray level obtained in step 405. The browser UI driver 12 configures a preview window using the acquired image element and text element in step 419. The preview window may be configured such that an image element is located on the left side thereof and a text element is located on the right side thereof. The preview window is overlaid on the collage image. In the above example, although information about the text element is included in the preview window, the preview window may include either only the image element or only the text element. Alternatively, the preview window may include an execution icon for a function which can be executed using a media content corresponding to a specific image element. For example, if the media content is an image file, a display icon or an editing function icon of the image file may be included in the preview window. In the case of an audio file, a play icon may be included in the preview window. The preview window may include a cancel icon, which can cancel a display of the preview window.

The browser UI driver 12 confirms whether the function execution icon is selected under the state that the preview window is overlaid in step 421. If the function execution icon is selected, a function corresponding to the selected icon is executed in step 423. The browser UI driver 12 confirms whether the cancel icon is selected in step 425. If it is selected, the browser UI driver 12 exits the preview window in step 427 and returns to step 403.

Meanwhile, in step 411, the selection input may not be generated and instead, a representative function execution input may be generated. The representative function execution input may be, for example, a double click. That is, a double click may occur without any selection under the state that the pointer is located on the collage image. If such a representative function execution input is generated in step 413, the browser UI driver 12 executes a representative function, which is set corresponding to an image element corresponding to a gray level of a location where the double click occurs. If a media content is a phonebook, the browser UI driver 12 may make an outgoing call using a telephone number which has been registered in relation to a name corresponding to an image element of a location where the double click is generated.

Figure 8:
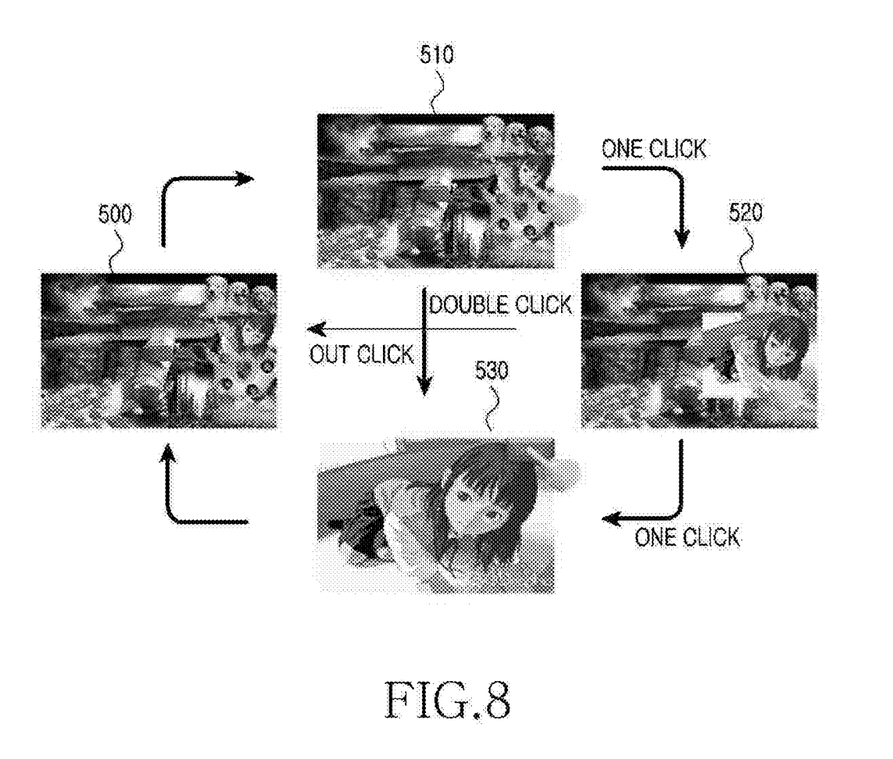
FIGS. 8 to 10 are diagrams illustrating examples of browser UI execution related to various types of media content according to an embodiment of the present invention.
Figure 9:
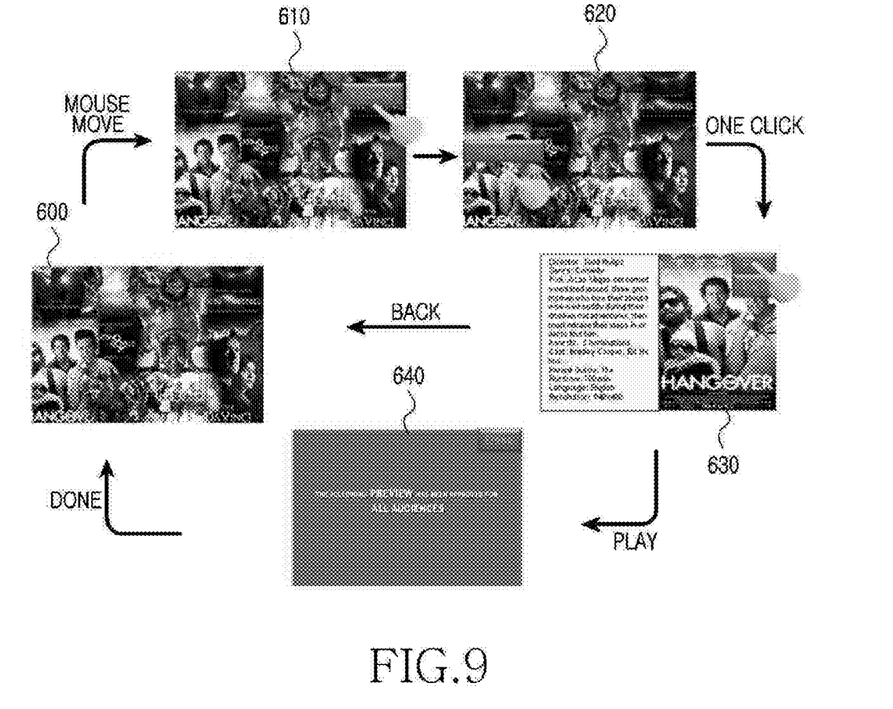
Figure 10:
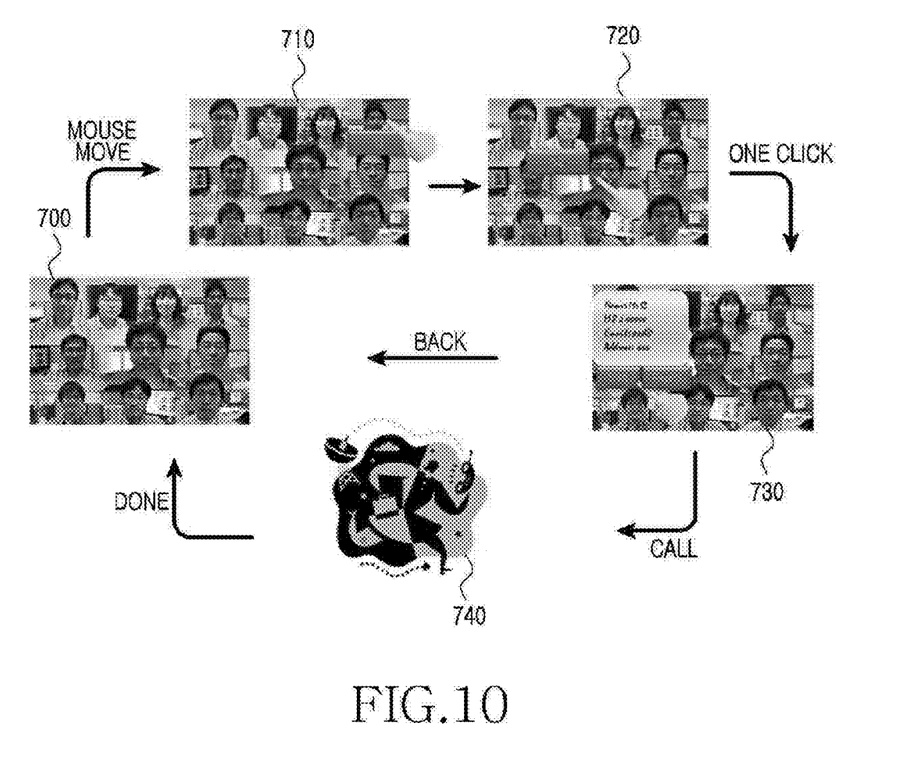

Detailed operating scenarios according to the control of the browser UI will now be described with reference to FIGS. 8 to 10. FIG. 8 illustrates the execution of the browser UI related to an image file, FIG. 9 illustrates the execution of the browser UI related to a moving picture file of a film, and FIG. 10 illustrates the execution of the browser UI related to a phonebook.

FIG. 8 illustrates the execution of an image browser UI. The image browser UI is configured as follows. A group of image elements corresponding to a group of image files are used to generate a collage image. A gray level label is added to each pixel of an image element region arranged on the collage image, thereby generating a metadata file. In this embodiment, it is assumed that a text element is omitted. This is because, in the case of an image file, it is possible to browse and search an image even though the text element is omitted. The image browser UI is configured by grouping the image element, the metadata file, and the collage image.

As the image browser UI is provided to a user, a pointer is displayed, as in an image 510, under the state that a collage image 500 is displayed. If a user clicks on any location where the pointer is positioned on the collage image, the UI driver 12 senses that a selection input has occurred. Then, the UI driver 12 chooses an image element related to the clicked point from the metadata file. If a coordinator of the clicked point is (x,y), a gray level within the metadata file may be represented as g=MI(x,y). Since the gray level is mapped to the image element, the gray level is used to obtain the image element. The obtained image element is included in a preview window and is overlaid on the collage image as an image 520.

If a click is generated again on the image 520, the UI driver 12 determines the execution of a function and displays an image file of the clicked point on the entire screen as an image 530. If a click is sensed on a part except for a preview window region, the UI driver 12 exits the preview window as in the image 500.

If a user double-clicks on any location where the pointer is positioned on the collage image, the UI driver 12 determines that a representative function execution input has occurred and displays an image file corresponding to double-clicked location on the entire screen as in the image 530. A "Done" icon is clicked to change the state of the image browser UI to a collage image display state.

A moving picture browser UI will now be described with reference to FIG. 9.

An album art, DVD cover or screenshot image is collected from each moving picture file. Such image is an image element related to each moving image file. A text element including information about a moving picture file, such as a title, director, genre, running time, resolution, or casting, is generated for each moving picture file. A collage image is generated using image elements obtained from moving picture files. A label, that is, a gray level, is allocated to each pixel of the collage image and an image element is mapped to each gray level, thereby generating a metadata file.

If the moving picture browser UI is provided, a moving picture collage image 600 is displayed. If a mouse is moved on the moving picture collage image, a title of a video clip corresponding to the location of the mouse. That is, representative information may be displayed as in an image 610. In other words, location coordinates (x,y) of a pointer on the collage image is determined and a gray level is obtained from the metadata file using the location coordinates. The representative information is obtained from a text element related to the gray level and is overlaid on the moving picture collage image with being included in a representative information window as in the image 610.

If a single click is generated in the state that a preview window is displayed, an image element and a text element are acquired using the location coordinates (x,y) of a point where the click is generated. Then the preview window is configured and is overlaid on the collage image as an image 630. If a double click is generated, a moving picture file corresponding to the clicked point is played as an image 640.

If a "play" icon is selected on the image 630, a video file is played as in the image 640. If the video file has been played or a cancel icon is selected, the moving picture collage image 600 is displayed.

A phonebook browser UI will now be described with reference to FIG. 10.

The phonebook browser UI may be used as a tool for browsing a phonebook stored in, for example, a cellular phone and making a call. If a face image corresponding to a name entry of the phonebook is designated, an image element is generated using the face image. Moreover, a text element is generated including a name, address, telephone number, birthday, or facsimile number and the generated text element is linked with the face image element. A collage image is generated using face image elements and a label is added to each face image element and each pixel of the collage image, thereby generating a metadata file.

If a phonebook browser UI mode is set, a collage image 700 is displayed. As a pointer on the collage image is moved, current location coordinates of the pointer is identified. A gray level is obtained using the location coordinates from the metadata file and a text element related to the gray level is identified to obtain representative information, that is, a name. The obtained name is included in a representative information window and is overlaid on the collage image as an image 710 and an image 720.

Under such a state, if a single click is generated, a text element is obtained using location coordinates of the clicked point and a preview window including information of the text element is configured and is overlaid on the collage image as an image 730.

If a "call outgoing" icon is selected, an outgoing call is made as an image 740.

If a double click is generated on the collage image, a call outgoing operation may be performed using a telephone number registered in a name entry corresponding to a location where the double click is generated as the image 740.

According to embodiments of the present invention, user manipulation for browsing and selecting a plurality of media contents can be simplified and each media content can be easily identified. Information about media contents can be effectively transmitted and functions related to a media content selected by a user can be quickly executed.

Although the embodiments of the present invention have been disclosed for illustrative purposes, various modifications, additions and substitutions are possible, without departing from the scope and spirit of the invention as disclosed in the accompanying claims. For example, different types of media contents may be provided through one browser UI. Accordingly, the scope of the present invention should not be limited to the description of the embodiment, but defined by the accompanying claims and equivalents thereof.

What is claimed is:

1. A method for browsing media content and executing functions related to the media content by a browser device, comprising:
displaying a collage image generated by combining a plurality of image elements corresponding respectively to a plurality of media contents into the collage image;
if a selection input is generated on the collage image, obtaining at least one element of an image element and a text element corresponding to a pixel location where the selection input is generated using a meta data file, where the obtained at least one element corresponds to a specific media content from among the plurality of media contents; and
configuring a preview window for the specific media content using the obtained at least one element to overlay the preview window on the collage image,
wherein the text element corresponds to the specific media content and includes information about the specific media content,
wherein the meta data file includes identifier information of each of the plurality of image elements corresponding to respectively to pixel locations of the collage image, and
wherein the obtaining the at least one element of the image element and the text element corresponding to the pixel location where the selection input is generated using the meta data file comprises:
sensing whether there is the selection input generated on the collage image;
determining location coordinates of the pixel corresponding to the location of the point where the selection input is generated;
determining a label allocated to the location coordinates; and
obtaining at least one element of the image element and the text element corresponding to the one of the plurality of media contents corresponding to the determined label.

2. The method of claim 1, further comprising:
if a function execution input is generated on the collage image, obtaining a text element corresponding to a pixel location where the function execution input is generated using the meta data file; and
performing a representative function using a media content corresponding to the obtained text element according to information about the representative function included in the obtained text element,
wherein the meta data file includes identifier information of each of a plurality of text elements corresponding to respectively to pixel locations of the collage image.

3. The method of claim 1, further comprising, if a function icon included in the preview window is selected, performing a function corresponding to the function icon using the specific media content corresponding to the obtained at least one element.

4. The method of claim 1, further comprising:
confirming a current location of a pointer on the collage image;
confirming representative information by obtaining a text element corresponding to the location of the pointer; and
overlaying a window including the representative information on the collage image.

5. The method of claim 1, wherein the collage image is generated as one image by arranging and combining the plurality of image elements.

6. The method of claim 5, wherein the plurality of image elements is arranged in image element regions of the collage image and a gray level of an image element is allocated to each pixel corresponding to each of the image element regions as a label.

7. The method of claim 2, wherein, if a type of the specific media content is phonebook data, an outgoing call is made using a telephone number registered in a name entry corresponding to a location of a point where the function execution input is generated.

8. The method of claim 1, wherein a type of the plurality of media contents is any one of image data, moving picture data, text data, and audio data.

9. The method of claim 1, wherein obtaining the at least one element and the text element corresponding to the location of the point where the selection input is generated comprises:
checking a gray level of a pixel in a metadata file at a location corresponding to the location of the point where the selection input is generated in the collage image;
determining a one of the plurality of image elements corresponding to the location of the point where the selection input is generated according to the checked gray level; and
obtaining at least one element and a text element corresponding to one of the plurality of media contents corresponding to the determined one of the plurality of image elements.

10. A browser device for browsing media content and executing functions related to the media content, comprising:
a display;
a memory for storing a plurality of media contents; and
a controller for controlling the display to display a collage image generated by combining a plurality of image elements corresponding respectively to a plurality of media contents into the collage image, if a selection input is generated on the collage image, obtaining at least one element of an image element and a text element corresponding to a pixel location where the selection input is generated, using a meta data file, where the obtained at least one element corresponds to a specific media content from among the plurality of media contents, and configuring a preview window for the specific media content using the at least one element to overlay the preview window on the collage image,
wherein the text element corresponds to the specific media content and includes information about the specific media content,
wherein the meta data file includes identifier information of each of the plurality of image elements corresponding to respectively to pixel locations of the collage image, and
wherein the controller senses whether there is the selection input generated on the collage image, determines location coordinates of the pixel corresponding to the location of the point where the selection input is generated, determines a label allocated to the location coordinates, and obtains at least one element of the image element and the text element corresponding to the one of the plurality of media contents corresponding to the determined label.

11. The browser device of claim 10, wherein, if a function execution input is generated on the collage image, the controller obtains a text element corresponding to a pixel location where the function execution input is generated using the meta data file, and performs a representative function using the specific media content according to information about the representative function included in the obtained text element, wherein the meta data file includes identifier information of each of a plurality of text elements corresponding respectively to pixel locations of the collage image.

12. The browser device of claim 10, wherein, if a function icon included in the preview window is selected, the controller performs a function corresponding to the function icon using the specific media content corresponding to the obtained at least one element.

13. The browser device of claim 10, wherein the controller confirms a current location of a pointer on the collage image, confirms representative information by obtaining a text element corresponding to the location of the pointer, and overlays a window including the representative information on the collage image.

14. The browser device of claim 10, wherein the collage image is generated as one image by arranging and combining the plurality of image elements.

15. The browser device of claim 14, wherein the plurality of image elements is arranged in image element regions of the collage image and a gray level of an image element is allocated to each pixel corresponding to each of the image element regions as a label.

16. The browser device of claim 11, wherein, if a type of the specific media content is phonebook data, an outgoing call is made using a telephone number registered in a name entry corresponding to a location of a point where the function execution input is generated.

17. The browser device of claim 10, wherein a type of the plurality of media contents is any one of image data, moving picture data, text data, and audio data.

18. The browser device of claim 10, wherein obtaining the at least one element and the text element corresponding to the location of the point where the selection input is generated includes checking a gray level of a pixel in a metadata file at a location corresponding to the location of the point where the selection input is generated in the collage image, determining a one of the plurality of image elements corresponding to the location of the point where the selection input is generated according to the checked gray level, and obtaining at least one element and a text element corresponding to one of the plurality of media contents corresponding to the determined one of the plurality of image elements.

* * * * *